Figure 1:
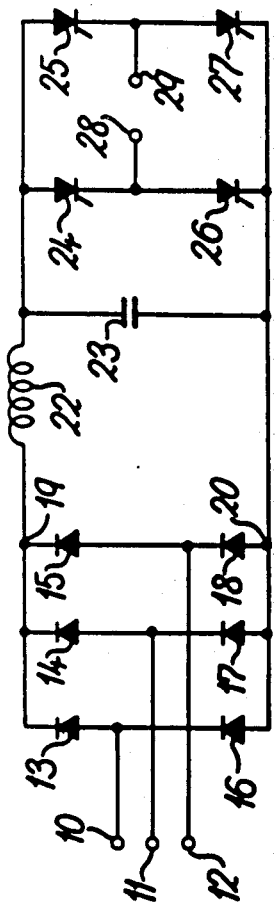

United States Patent [19]
Smith et al.

[11] 3,894,210
[45] July 8, 1975

[54] METHODS AND APPARATUS FOR ALTERNATING-CURRENT ARC WELDING

[75] Inventors: Gordon Arthur Smith, Oadby; Robert George Stephens, Anstey, both of England

[73] Assignee: National Research Development Corporation, London, England

[22] Filed: Mar. 20, 1973

[21] Appl. No.: 342,981

[30] Foreign Application Priority Data
Mar. 21, 1972 United Kingdom............... 1317272

[52] U.S. Cl............................. 219/131 R; 219/137
[51] Int. Cl............................................. B23k 9/10
[58] Field of Search..... 219/131 R, 131 WR, 131 F, 219/137

[56] References Cited
UNITED STATES PATENTS

| | | | |
|---|---|---|---|
| 3,068,352 | 12/1962 | Correy................................. | 219/137 |
| 3,300,683 | 1/1967 | Weishaar........................ | 219/137 X |
| 3,350,538 | 10/1967 | Johnson........................... | 219/131 R |
| 3,555,239 | 1/1971 | Kerth........................ | 219/131 R X |
| 3,598,954 | 8/1971 | Iceland et al. .................. | 219/131 R |
| 3,668,361 | 6/1972 | O'Connor....................... | 219/131 X |
| 3,728,515 | 4/1973 | Gedgaudas...................... | 219/131 R |

FOREIGN PATENTS OR APPLICATIONS

| | | | |
|---|---|---|---|
| 907,750 | 7/1959 | United Kingdom............. | 219/131 R |
| 1,109,802 | 6/1960 | Germany......................... | 219/131 R |

Primary Examiner—Arthur T. Grimley
Assistant Examiner—Clifford C. Shaw
Attorney, Agent, or Firm—Cushman, Darby & Cushman

[57] ABSTRACT

A method of alternating-current gas-shielded arc welding is described, the method being particularly suitable for welding aluminium, its alloys and similar materials. The method employs an arc current which alternates rapidly in polarity and the mean value of which is varied over relatively long intervals. The current magnitude is preferably increased gradually from zero, held constant and then reduced gradually to zero, with the above mentioned mean value variation superimposed. Apparatus for carrying out the method is described, which includes an inverter using thyristors as active elements to control arc current magnitude and to give the required rapid current reversals.

25 Claims, 7 Drawing Figures

METHODS AND APPARATUS FOR ALTERNATING-CURRENT ARC WELDING

The present invention relates to methods and apparatus for a.c. gas shielded arc welding where the electrode used is not consumed. The invention is particularly applicable to welding materials having an oxide film, such as aluminium and its alloys, manganese alloys and brass. The oxide film which is present on the material and/or forms during welding in spite of the shielding gas, is broken down by the use of an a.c. arc.

In known a.c. welding methods for aluminium alternate current pulses having opposite polarities are used but the present invention stems from the realisation that a cyclic variation of the means current taken over relatively long intervals is useful in obtaining good welds.

It is an object of the present invention to provide improved welding cycles in a.c. welding and to provide apparatus for automatically carrying out these welding cycles.

According to a first aspect of the present invention there is provided a method of electric arc welding using a substantially non-consumable electrode, including applying a voltage between the electrode and a workpiece to strike an arc, the voltage periodically alternating in polarity and cyclically varying the arc current to provide an arc current, the average magnitude of which, for intervals each equal to the period of the polarity alternations varies at ordered intervals which singly are longer than the said period.

The applied voltage may be in the form of alternate positive and negative pulses, the amplitude of which may be increased gradually from zero with superimposed periodic negative and positive going amplitude steps.

The amplitude of the pulses is then held constant except for the continuation of the steps, which provide the average arc current variation, and later reduced gradually to zero with the steps continuing. The rates of increase, decrease, the magnitude of the steps and the durations of the intervals between the steps are preferably independently variable to suit the individual welding processes.

Instead the applied voltage waveform may comprise groups of pulses of one polarity alternated with groups of pulses having the other polarity, the pulses within each group having a repetition frequency higher than the frequency of voltage alternation, and the duration of the pulses varying to provide the required variation in average magnitude of welding current. In addition, the duration of the pulses may be gradually increased with superimposed negative and positive changes in duration until a maximum duration is reached; the maximum may be maintained except for the changes in duration, and then gradually reduced with the changes continuing.

Since such welding cycles are related to pulsed TIG welding where d.c. is used, the advantages of the TIG process as applied to a.c. welding can be obtained.

An important feature of the invention stems from the realisation that by using a relatively high repetition frequency and/or a square wave shape for the applied voltage in which change over from one polarity maximum voltage to the other polarity maximum is typically achieved in approximately $100\mu$ secs, it is probably that there will not be time for the ions present in an arc to disperse at current zero before current begins to flow in the opposite direction. Thus a problem met in previous a.c. welding systems, the tendency of the arc to require special igniting procedures each time polarity reverses, is expected to be overcome.

The applied voltage pulses may have a repetition frequency of up to 400 Hz or above.

According to a second aspect of the present invention there is provided apparatus for use in gas shielded electric arc welding, including a first terminal for connection to a non-consumable electrode, a second terminal for connection to a workpiece, first arc-control means for applying a voltage between the terminals to strike an arc between the electrode and the workpiece, the voltage alternating in polarity, and second arc-control means for cyclically varying the arc current to provide an arc current the average magnitude of which, for intervals each equal to the period of the polarity alternations, varies at ordered intervals which singly are longer than the said period.

Preferably the first arc-control means includes two d.c. supply terminals, four controlled rectifiers, and firing means coupled to the controlled rectifiers, the rectifiers being connected in first and second series pairs, the two pairs being connected in parallel between the d.c. supply terminals, the rectifiers all being poled in the same direction with respect to the d.c. supply terminals, and the first and second terminals being connected at the common connections of the first and second rectifier pairs, respectively.

The above-mentioned required rate of switch over from maximum voltage in one sense to maximum in the other sense, or repetition frequency of voltage pulses, can be achieved by using modern inverter-grade thyristors as the controlled rectifiers.

The apparatus may include a bridge-rectifier circuit where an a.c. supply is to be used, the bridge circuit being connected, preferably by way of a smoothing circuit to the d.c. terminals.

The second arc-control means may include means for varying the voltage applied to the d.c. supply terminals; for example, if the bridge rectifier comprises controlled rectifiers instead of ordinary rectifiers, the duty cycle of the controlled rectifiers can be varied to change the voltage at the d.c. supply terminals.

Instead the second arc-control means may include commutation means for controlling the controlled rectifiers of the first arc-control means. In operation the commutation means commutates the controlled rectifiers after conduction intervals of duration dependent on the required average welding current at that time.

Apparatus according to the invention may also include a servo-system for controlling the arc current, comprising a reference circuit for supplying a reference signal to comparison means, means for supplying a signal indicative of the arc current to the comparison means, and means for controlling the second arc-control means in accordance with the output of the comparison means.

The reference circuit may include means for generating a voltage which increases gradually from zero, assumes a constant value and then decreases gradually to zero, and means for alternately selecting first and second proportions of the voltage for application to the comparison means as the reference signal. Advantageously controls are provided for independently setting some or all of the following:

The rates of increase and decrease of the voltage, its constant value, the repetition frequency at which the variations in the average magnitude of arc-current occur, and the first and second proportions (one of which may be unity).

The means for controlling the second arc-current means may include an oscillator and a circuit for providing pulses at the oscillator frequency but of width dependent on the output signal from the comparison means, the apparatus being such that in operation firing and commutation of the controlled rectifiers is coincident with the leading and trailing edges, respectively, of the variable width pulses.

In this specification the term controlled rectifier means any device in which conduction occurs between first and second electrodes only after a signal has been applied to a control terminal and then only if a predetermined polarity of bias is applied to the electrodes. Thereafter, conduction ceases only when the current falls to zero or tends to pass through zero.

Figure 4:
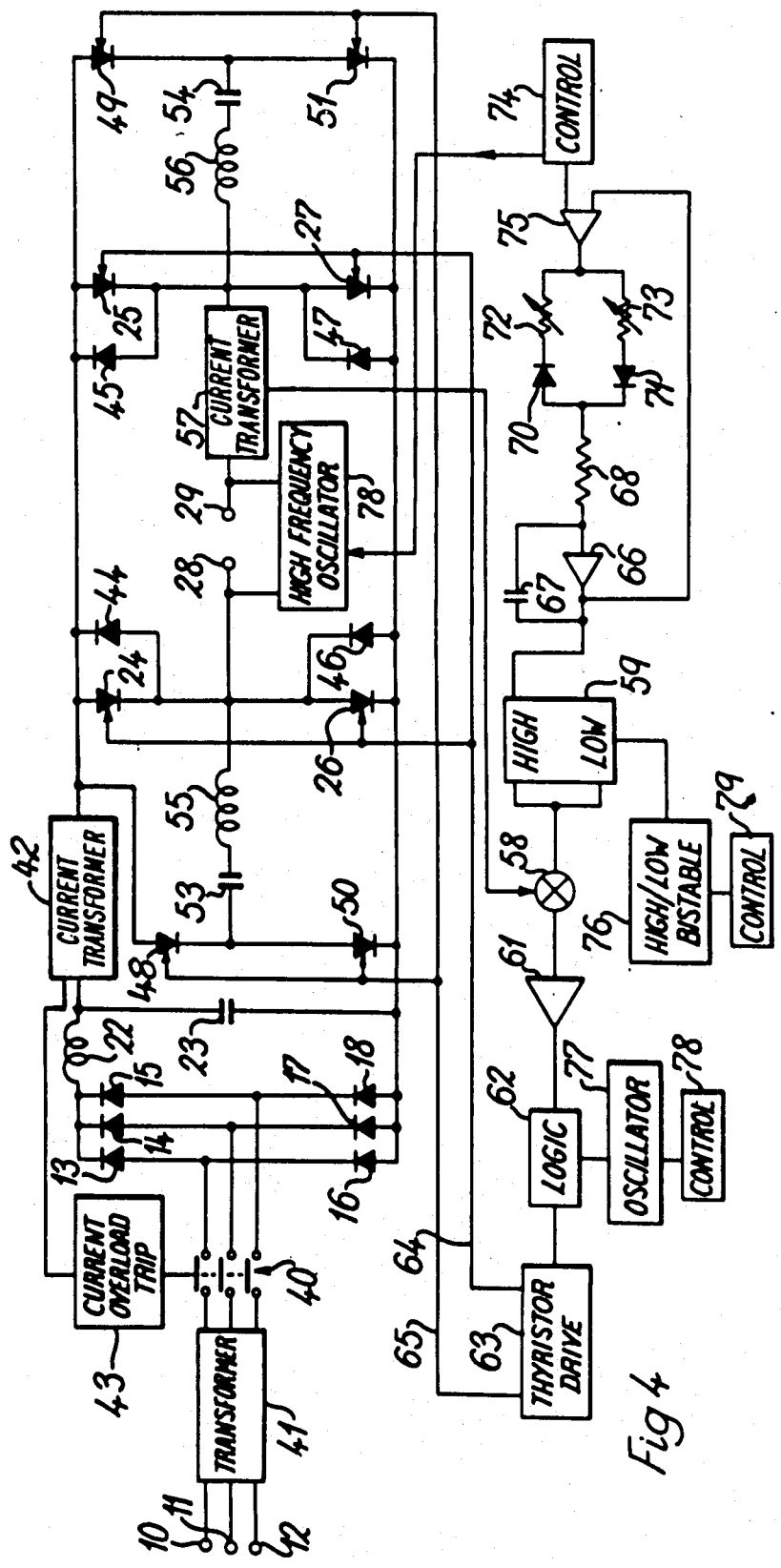
Figure 2:
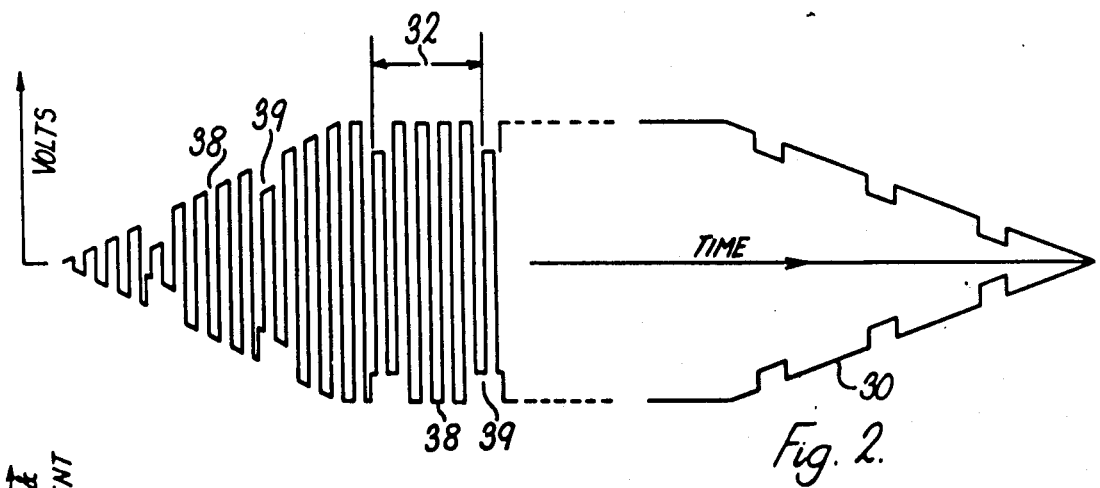
Figure 3:
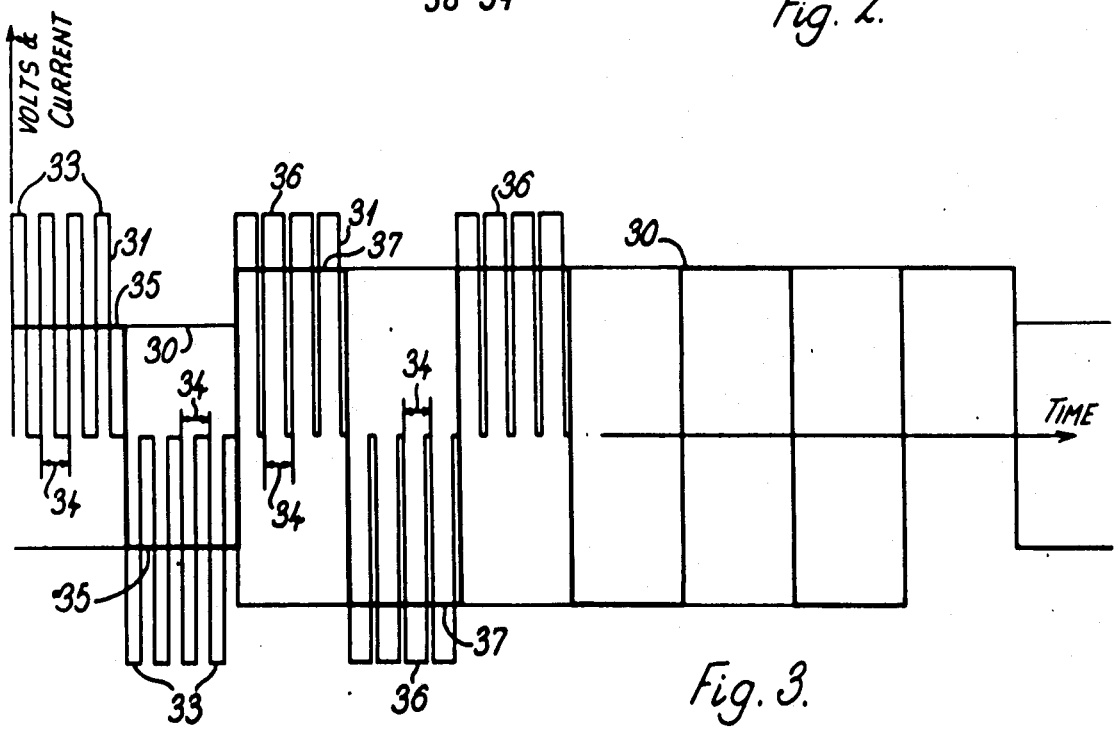
Figure 6:
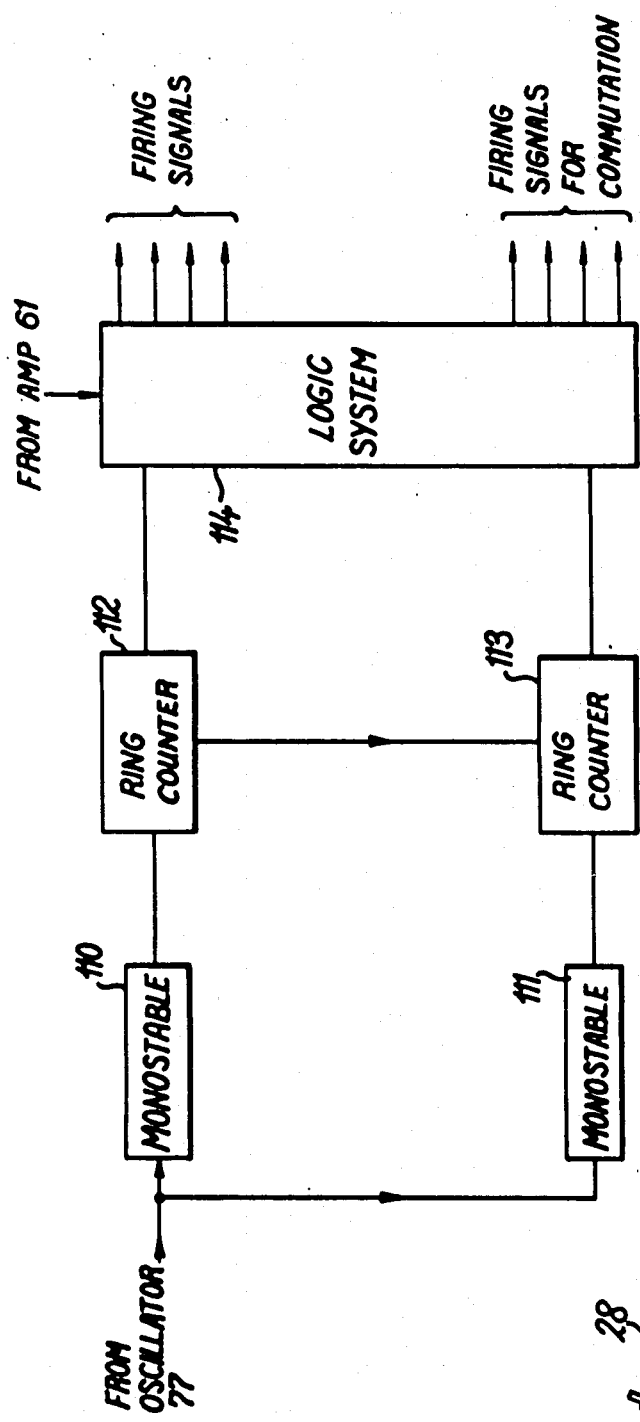
Figure 5:
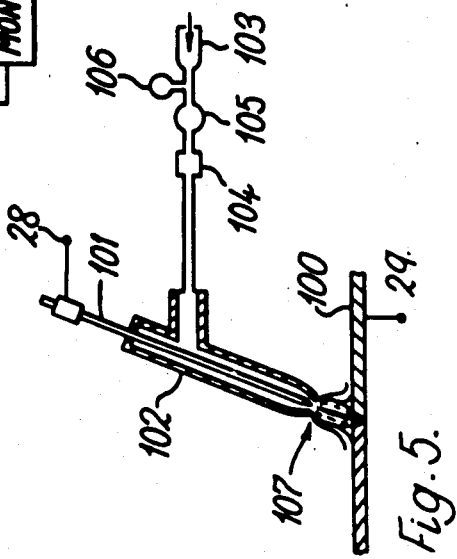
Figure 7:
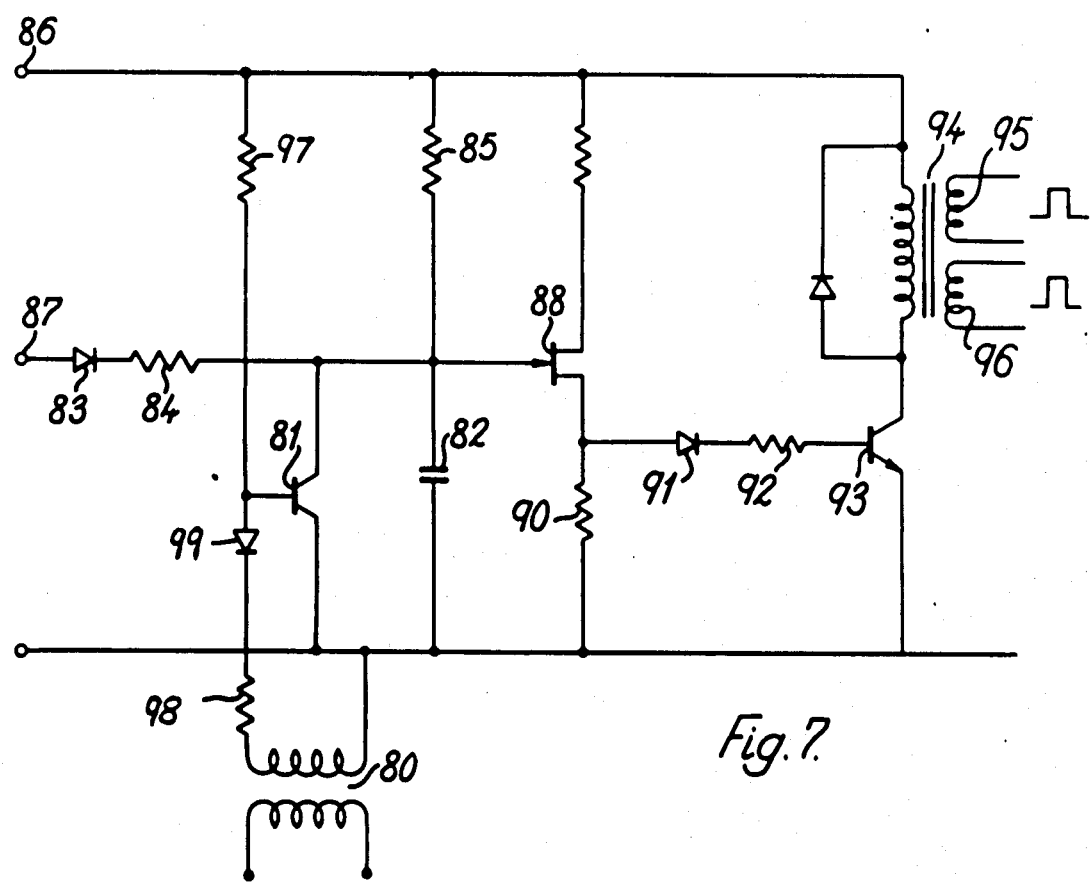

Certain embodiments of the invention will now be described, by way of example, with reference to the accompanying drawings in which:

FIG. 1 is a circuit diagram of part of the apparatus according to the invention;

FIGS. 2 and 3 are waveform diagrams used in explaining methods according to the invention, FIG. 4 is a part-circuit part-block diagram of apparatus according to the invention in which a servo-system controls the welding current, FIG. 5 is a schematic cross-section of a welding head which may be used with the circuit of FIG. 1, FIG. 6 is a block diagram of the logic circuit of FIG. 4, and FIG. 7 is a circuit diagram of a firing circuit for use in a modification of the circuit of FIG. 1.

In FIG. 1, terminals 10, 11 and 12 are for the connection of a three phase a.c. supply, and rectifiers 13 to 18 form a three phase bridge providing d.c. at points 19 and 20. A choke 22 and a capacitor 23 form an elementary smoothing circuit before the d.c. is passed to four thyristors under the control of known firing circuits (not shown). Terminals 28 and 29 are part of a welding head in which one terminal is connected to a workpiece 100 (see FIG. 5) and the other to a tungsten rod 101. An electrode holder 102 forms a chamber round the rod 101 and this chamber is connected to an inlet 103 for the supply of an inert gas. The gas passes through a flowmeter 104 and a regulator 105, gas pressure being measured by means of a gauge 106. The gas flows through the chamber in the holder 102 to a nozzle 107 of refractory ceramic. When an arc is struck between the tungsten rod 101 and the workpiece 100, the inert gas flows from the nozzle to surround the arc and the weld area. Since such heads are well known for gas shielded arc welding, the head will not be described further.

In operation the voltage applied between the terminals 28 and 29 and hence the current in the welding arc is to be as shown in FIG. 2. The waveform comprises alternate positive and negative pulses at a constant repetition frequency of between 50 and 400 Hz, and has an envelope which varies cyclically having alternate high 38 and low 39 amplitude intervals. The waveform amplitude gradually increases from zero, attains a constant value, and decreases again to zero, and a cyclic reduction in amplitude is superimposed. The envelope 30 is shown by a dashed line at the centre of FIG. 2 to indicate that the constant amplitude portion is considerably longer for example five times longer than each of the sloping portions. The individual oscillations of the applied voltage are not shown to the right of FIG. 2 in order that the envelope is clearly seen.

One way in which an approximation to the current waveform of FIG. 2 can be achieved is controlling the firing and commutation of the thyristors 24 to 27 to provide the voltage waveform of FIG. 3. The thyristors are fired in pairs: the pair 24 and 27 and the pair 25 and 26 to give opposite polarity pulses. For the waveform of FIG. 3 firing is at regular intervals but commutation is arranged, by means of known circuits, to occur after a further interval dependent on the total current required. For example, FIG. 3 covers the time 32 of FIG. 2 during which a low amplitude voltage 39 and consequent welding current is followed first by a high amplitude voltage 38 and current, and then a further low amplitude voltage 39 and welding current. During low amplitude intervals the pairs of thyristors are fired and commutated to conduct for short intervals 33 in each possible conduction interval 34, governed by the periodic firing of a pair of thyristors. As a result the same low average magnitude current 35 is obtained over both positive and negative half cycles of the voltage polarity alternations, one of the pulses in a low amplitude interval 39 of FIG. 2. When high amplitude currents are required the intervals of conduction of the pairs of thyristors are increased as at 36 in each possible conduction interval 34 so that the same high average magnitude current 37 is obtained over both positive and negative half cycles of the voltage polarity alternations, corresponding to one of the pulses in a high amplitude interval 38 of FIG. 2. As in FIG. 2, the actual voltage waveform is not shown at the right of FIG. 3 so that the pulses of FIG. 2 and the envelope 30 can be clearly seen.

Apparatus for performing the work cycle of FIG. 2, using the waveform of FIG. 3 will now be described in more detail with reference to FIG. 4, where components which have the same functions as in FIG. 1 are designated in the same way.

The terminals 10 to 12 are connected to the bridge comprising the rectifiers 13 to 18 by way of a group of contacts 40 and a three phase transformer 41, to reduce the supply voltage to about forty volts. A current transformer 42 is coupled to an overload-trip circuit 43 to ensure that excessive arc current or fault current cause the contacts 41 to be opened.

The bridge output is, as in FIG. 1, connected by way of the smoothing choke 22 and capacitor 23, and the thyristors 24 to 27 to the weld head terminals 28 and 29. The thyristors 24 to 27 have parallel connected diodes 44 to 47, respectively, to allow reverse currents to flow in known manner under some power factor conditions occurring between the terminals 28 and 29.

Thyristors 48 to 51, capacitors 53 and 54 and inductors 55 and 56 are connected to commutate the thyristors 24 to 27. For example if the thyristors 24 and 27 are conducting, the capacitors 53 and 54 will have been charged during the last commutation so that the electrodes connected to the inductors 55 and 56 are positive and negative, respectively, with respect to the other electrodes. When commutation is to take place the thyristors 48 and 51 are fired applying the voltages across the capacitors 53 and 54 to reverse bias the thyristors 24 and 27.

The arc current is controlled by a servo-system which includes a current transformer 57, a subtraction circuit 58 which receives the output from the current transformer and also a reference signal from a reference circuit 59, an amplifier 61, a logic circuit 62 and a thyristor drive circuit 63. The firing and commutation of the thyristors 24 to 27 is controlled by the drive-circuit means of channels 64 and 65 shown as single lines but each in fact comprising several connections.

The reference circuit 59 provides a reference voltage which varies in the same way as the positive going envelope of FIG. 2, that is, it has two components: a first rising gradually to a maximum value remaining constant for a time and then decreasing to zero; and a second component superimposing uniform positive and negative going steps.

The first component is obtained from the output of an integrator comprising an amplifier 66, a capacitor 67, a resistor 68, diodes 70 and 71 and variable resistors 72 and 73. A control circuit 74 is arranged to provide under manual control a positive voltage when each welding operation is to commence and to maintain the voltage until the arc current is to decrease gradually. In operation the voltage from the circuit 74 is applied by way of a differential amplifier 75 to the resistor 73 which is set to give a time constant, with the resistor 68 and the capacitor 67, which ensures the required rate of change of reference voltage. When the voltage at the output of the amplifier 66 equals the voltage at the output of the control circuit 74, the output of the amplifier falls to zero and no further change takes place until the output of the control circuit 74 falls to zero. At this time the output voltage of the amplifier 75 becomes negative and the output of the amplifier 66 falls to zero under the control of the time set by the resistor 72. The diodes 70 and 71 allow the rate of rise and the rate of fall of the first component to be controlled independently, since one is forward biased and one reversed biased when the output voltage of the amplifier has either polarity.

The second component is controlled by a bistable circuit 76 which has a control circuit 79 including potentiometers (not shown) to set the time the bistable circuit remains in each of its two states. Hence the durations of the high and low voltages of FIG. 2 are controlled and set. The output of the bistable circuit 76 controls the circuit 59 to switch the current-demand signal from amplifier 66 to appear as a high/low signal for the subtraction circuit 58.

The circuit 59 includes a further potentiometer (not shown) connected to the output of the amplifier 66 and by way of a transistor (not shown) to the signal common rail. The slider of the potentiometer provides the output to the circuit 58 and the transistor is connected to be switched by the bistable circuit 76. When the transistor conducts one end of the further potentiometer is, in effect, grounded and only a portion of the voltage from the amplifier 66 reaches the circuit 58 whereas at other times the whole voltage is passed.

A variable frequency oscillator, with a frequency control 78, supplies a basic frequency to the logic circuit 62. Each half cycle of this basic frequency is divided into pulses, in the way shown in FIG. 3, and the mark/space ratio of these pulses is controlled from the amplifier 61 to provide the desired mean high or low current, these functions being carried out by the circuit 62 which is now described in more detail with reference to FIG. 6.

The oscillator 77 is connected to monostable circuits 110 and 111 having manually adjustable astable periods. Two stage ring counters 112 and 113 are clocked by the monostable circuits 110 and 11, respectively. As a result the counter 112 has a square wave output from one stage the leading edge of which causes the turning on of the thyristors 24 and 27 and the trailing edge of which causes the turning on of the thyristors 48 and 51 commutating the thyristors 24 and 27. With suitable thyristors 24, 27, 48 and 51, turn on and commutation takes about 20$\mu$ secs for each operation. The ring counter 113 also has a square wave output but delayed in relation to that from counter 112 by a time dependent on the astable periods of the monostable circuits 110 and 111. The relative delay is usually set to about 60$\mu$ secs. The square wave from counter 113 causes the turning on of the thyristors 25, 26, 49 and 50 in a similar way to the action of the counter 112 and its associated thyristors 24, 27, 48 and 51. However, due to the delay the thyristors 24 and 27 are turned off before the thyristors 25 and 26 are turned on, thus preventing the d.c. supply being short circuited. A complete current reversal can thus be seen to occur in 100$\mu$ secs when the delay is 60$\mu$ secs.

The square wave signals from the counters 112 and 113 pass to a gating system 114 where the firing pulses for the thyristors are generated. The gating system 114 receives the signal from the output of the amplifier 61 and generates the firing pulses in accordance with the square waves from the counters and the mean current required. In so doing firing pulses for a number of arc current pulses, such as pulses 33 and 36 in FIG. 3, are produced for each half cycle of the waveform 33. The logic circuit is not described in detail since it is simply a matter of following techniques well known to those familiar with electronic logic elements.

On leaving the logic system 62 the firing pulses are amplified by the drive circuit 63 before reaching the thyristors.

Suitable thyristors having the required switch-on time of 20$\mu$ secs or less for various current ratings are commercially available. Two examples are the Brown-Boveric types CS 239 and CS 169 which have current ratings allowing the arc current to reach about 200 to 300 Amps and 150 to 200 Amps, respectively.

Where a large number of welds of different types are to be performed, each type having a different predetermined welding cycle, a controller (not shown) may be added in which the resistors 72 and 73, the potentiometer setting the amplitude of the steps in the reference signal, and the potentiometers setting the durations of the two states of the bistable circuit 76 are all controlled by a punched card. For each type of weld the appropriate card is simply inserted into the controller and all the controls for the required working cycle are automatically set.

The logic circuit 62 and the thyristor drive circuit 63 are not described in detail since similar circuits are well known and the general principles for designing such circuits are also known.

To reduce any tendency to arc extinction the circuits 62 and 63 and the associated thyristor circuits are designed to provide swing from maximum positive to maximum negative voltage and vice versa between the terminals 28 and 29 in approximately 100μ secs.

A high frequency oscillator 78, which may be the standard high frequency (h.f.) start circuit used in welding, is coupled to the electrodes 28 and 29 to strike the arc initially in a way well known in electric arc welding. In order to ensure the arc is struck at the correct time in relation to the rise of the reference signal, the control circuit 74 is coupled to the oscillator 78. A synchronising signal is passed when welding is to commence.

Although the apparatus of FIG. 4 is shown working from a three-phase supply it can, by modification of the bridge or omission altogether, be supplied from other multi-phase supplies, a single phase supply or a d.c. supply.

Another way in which the current waveform of FIG. 2 can be obtained is by replacing the rectifiers 13 to 18 by thyristors and providing firing circuits for the thyristors. The firing circuits are of the known type which control the conduction period in each appropriate half cycle of the three phase input voltage so that currents flow for the whole of or a portion of each half cycle. An example of a suitable firing circuit for the thyristors is shown in FIG. 7 and described below. After smoothing in the capacitor 23 and the choke 22 a voltage is obtained for application to the thyristors 24 to 27 which varies in accordance with the conduction interval, or duty cycle, of the thyristors. Hence by arranging for the firing circuits for the bridge thyristors to provide short conduction intervals when a low current in the arc is required, and long conduction intervals when a high arc current is required, the waveform of FIG. 2 is obtained. With this arrangement each pair of thyristors 24 and 27, and 25 and 26 conduct for complete positive and negative pulses, respectively, of FIG. 2.

In the circuit of FIG. 7 for firing thyristors replacing the diodes 13 to 20 of FIG. 1, a main a.c. supply coupled to the primary of a transformer 80 prevents a transistor 81, coupled to the secondary of the transformer 80, from conducting during negative half cycles of the supply voltage. Thus a capacitor 82 is allowed to charge during the negative half cycles through the action of the transistor 81 but not during positive half cycles. The transistor 81 is biased in the usual way by means of resistors 97 and 98 and a diode 99. Initially the capacitor 82 charges by way of a diode 83 and a resistor 84, and also by way of a resistor 85 from a d.c. supply connected to a terminal 86. A control voltage is applied to a terminal 87 to control the phase angle of firing the thyristor coupled to the circuit, and when the voltage across the capacitor 82 reaches the control voltage the diode 83 prevents further charging from the terminal 87. However, charging of the capacitor 82 continues through the resistor 85 until the trigger voltage of a unijunction transistor 88 is reached when the capacitor is discharged through a resistor 90. The resulting pulse is applied by way of a diode 91 and a resistor 92 to switch on a transistor 93. The voltage of the supply connected at the terminal 86 is thus applied across the primary winding of a transformer 94 and pulse outputs suitable for triggering thyristors appear in secondary windings 95 and 96. The phase angle of these trigger pulses relative to the a.c. supply is adjustable by varying the control voltage at the terminal 87 since by increasing this voltage the capacitor 82 triggers the unijunction transistor 88 more quickly. The use of the transformer 94 provides isolated outputs for connection to the thyristor gates. The sequence of firing thyristors in a three-phase bridge is well known and will not be described here except to say that the thyristors are fired in pairs and therefore three circuits of the type shown in FIG. 1 are required, each with its transformer 80 coupled to a different phase of the supply. The control voltages applied to the three circuits are the same and they are varied, for example, as at the output from the circuit 59 in FIG. 4 to give the desired waveform as in FIG. 2.

We claim:

1. A method of electric arc welding using a substantially non-consumable electrode, including applying a voltage between the electrode and a workpiece to strike an arc, the voltage periodically alternating in polarity, and varying the arc current to provide an arc current, the average magnitude of which, for intervals each equal to the period of the polarity alternations varies cyclically at a repetition frequency which has a longer period than the period of the polarity alternations.

2. A method according to claim 1 wherein the applied voltage comprises groups of pulses of one polarity alternated with groups of pulses having the other polarity, the pulses within each group having a repetition frequency which is higher than the repetition frequency of the polarity alternations.

3. A method of electric arc welding using a substantially non-consumable electrode, including applying a voltage between the electrode and a workpiece to strike an arc, the voltage periodically alternating in polarity, and varying the arc current to provide an arc current, the average magnitude of which, for intervals each equal to the period of polarity alternations, varies cyclically at a repetition frequency which has a longer period than the period of the polarity alternations, with the applied voltage comprising groups of pulses of one polarity alternated with groups of pulses having the other polarity, the pulses within each group having a repetition frequency which is higher than the repetition frequency of the polarity alternations, and wherein within each group the applied voltage variation is cyclic, and each pulse is applied for a portion of the period of the cyclic variation within each group, the duration of the said portion being varied to provide the said cyclic variation in average magnitude of arc current.

4. A method according to claim 3 wherein each welding operation comprises initial and final intervals in which a further variation of the duration of the said portion is superimposed as follows: during the initial interval the duration of the said portion is gradually increased, and during the final interval the duration of the said portion is gradually decreased.

5. A method according to claim 4 wherein the initial and final intervals are separated by an interval in which no further variation is superimposed.

6. A method according to claim 1 wherein the periodical alternations in polarity occur substantially without the voltage remaining at zero between alternations.

7. A method according to claim 6, wherein the applied voltage is in the form of alternate positive and negative pulses, with groups of successive pulses having a first average magnitude being alternated with groups of pulses having a second average magnitude to provide the said cyclic variation in average magnitude of arc current waveform.

8. A method according to claim 7 wherein each welding operation comprises initial and final intervals in which a further variation of pulse magnitude is superimposed as follows: during the initial interval the pulse magnitude is gradually increased and during the final interval the pulse magnitude is gradually decreased.

9. A method according to claim 8 wherein the initial and final intervals are separated by an interval in which no further variation is superimposed.

10. A method according to claim 1 wherein the repetition frequency of the periodical alternations in polarity is sufficiently high to prevent ions in the arc dispersing at current zero before the current again begins to flow.

11. A method according to claim 1 wherein the current waveform comprises rectangular pulses, and the changes from maximum current in one direction to maximum current in the opposite direction which occur with the periodical alternations in polarity are achieved in 100 microseconds or less.

12. Apparatus for use in gas shielded electric arc welding, including a first terminal for connection to a non-consumable electrode, a second terminal for connection to a workpiece, first arc-control means for applying a voltage between the terminals to strike an arc between the electrode and the workpiece, the voltage alternating in polarity, and second arc-control means for cyclically varying the arc current to provide an arc current the average magnitude of which, for intervals each equal to the period of the polarity alternations, varies cyclically at a repetition frequency which has a longer period than the period of the polarity alternations.

13. Apparatus according to claim 12 wherein the first arc control means includes two d.c. supply terminals, four controlled rectifiers, and firing means coupled to the controlled rectifiers, the rectifiers being connected in first and second series pairs, the two pairs being connected in parallel between the d.c. supply terminals, the rectifiers all being poled in the same direction with respect to the d.c. supply terminals, and the first and second terminals being connected at the common connections of the first and second rectifier pairs, respectively.

14. Apparatus according to claim 13 wherein the controlled rectifiers are thyristors.

15. Apparatus according to claim 13 wherein the second arc-control means includes means for varying the voltage applied at the d.c. terminals to provide the required variation in arc current.

16. Apparatus according to claim 15 wherein the means for varying the voltage applied at the d.c. terminals includes a bridge rectifier comprising a.c. terminals for the connection of an alternating current supply, additional controlled rectifiers connected to provide direct current at the d.c. terminals from an alternating current supplied at the a.c. terminals, and means for controlling the interval in each half cycle of the alternating current for which each additional controlled rectifier conducts.

17. Apparatus according to claim 16 wherein the controlled rectifiers are thyristors, chosen to allow the changes from maximum arc current in one direction to maximum current in the other direction to occur in 100 microseconds or less.

18. Apparatus according to claim 14 wherein the second arc-control means includes commutation means for controlling the intervals of conduction of the additional controlled rectifiers to provide the required cyclic variation in arc.

19. Apparatus according to claim 12 including a servo-system for controlling the arc current, comprising a reference circuit for supplying a reference signal to comparison means, means for supplying a signal indicative of the arc current to the comparison means, and means for controlling the second arc-control means in accordance with the output of the comparison means.

20. Apparatus according to claim 19 including means for generating a control voltage which increases gradually from zero, assumes a constant value and then decreases gradually to zero, and means for alternately selecting first and second proportions of the voltage for application to the comparison means as the reference signal.

21. Apparatus according to claim 20 including control means for setting at least one of the following: the rate of increase of the control voltage, the rate of decrease of the control voltage, the constant value assumed by the control voltage, the intervals at which the variations in the average magnitude of arc-current occur, the said first proportion and the said second proportion.

22. Apparatus according to claim 19 wherein the first arc control means includes two d.c. supply terminals, four thyristors, and firing means coupled to the thyristors, the thyristors being connected in first and second series pairs, the two pairs being connected in parallel between the d.c. supply terminals, the thyristors all being poled in the same direction with respect to the d.c. supply terminals, and the first and second terminals being connected at the common connections of the first and second thyristor pairs, respectively, and wherein the means for controlling the second arc-control means includes an oscillator and a circuit for providing pulses at the oscillator frequency but of width dependent on the output signal from the comparison means, the apparatus being such that in operation firing and commutation of the thyristors is coincident with the leading and trailing edges, respectively, of the variable width pulses.

23. Apparatus for use in electric arc welding, including a first terminal for connection to an electrode, a second terminal for connection to a workpiece, and arc-control means for applying a voltage between the terminals to strike an arc between the electrode and the workpiece, the voltage alternating in polarity, and for cyclically varying the arc current to provide an arc current the average magnitude of which, for intervals each equal to the period of the polarity alternations, varies at ordered intervals which singly are longer than the said period, the arc-control means being adapted to apply the said voltage in the form of groups of pulses of one polarity alternated with groups of pulses having the other polarity, the pulses within each group having a repetition frequency which is higher than the repetition frequency of the polarity alternations, the applied voltage variation within each group being cyclic, each pulse being applied for a portion of the period of the cyclic variation within each group, and the duration of the said portion being varied to provide the said average magnitude of arc current.

24. Apparatus according to claim 23 wherein the arc-control means includes means for superimposing a further variation of the duration of the said portion, during initial and final intervals of each welding operation, as follows: during the initial interval the duration of the said portion is gradually increased, and during the final interval the duration of the said portion is gradually decreased.

25. Apparatus for use in electric arc welding, including a first terminal for connection to an electrode, a second terminal for connection to a workpiece, and arc-control means for applying a voltage between the terminals to strike an arc between the electrode and the workpiece, the voltage alternating in polarity, and for cyclically varying the arc current to provide an arc current the average magnitude of which, for intervals each equal to the period of the polarity alternations, varies cyclically at a repetition frequency which has a longer period than the period of the polarity alternations, the arc-control means being adapted to apply the said voltage in the form of alternate positive and negative pulses, with groups of pulses having a first magnitude being alternated with groups of pulses having a second magnitude to provide the said cyclic variation in average magnitude of arc current, and the arc-control means also including means for superimposing a further variation in pulse magnitude, during initial and final intervals of a welding operation, as follows: during the initial interval the pulse magnitiude is gradually increased and during the final interval the pulse magnitude is gradually decreased.

* * * * *